(12) United States Patent
Sung

(10) Patent No.: US 11,623,643 B2
(45) Date of Patent: Apr. 11, 2023

(54) APPARATUS AND METHOD FOR CONTROLLING ARTICULATION OF ARTICULATED VEHICLE

(71) Applicants: Hyundai Motor Company, Seoul (KR); Kia Motors Corporation, Seoul (KR)

(72) Inventor: Byung Jun Sung, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 180 days.

(21) Appl. No.: 17/084,824

(22) Filed: Oct. 30, 2020

(65) Prior Publication Data

US 2021/0394758 A1 Dec. 23, 2021

(30) Foreign Application Priority Data

Jun. 23, 2020 (KR) .................. 10-2020-0076567

(51) Int. Cl.
*B60W 30/18* (2012.01)
*B60K 7/00* (2006.01)
*B60W 40/08* (2012.01)
*B60W 10/08* (2006.01)
*B60W 40/13* (2012.01)
*B60W 40/105* (2012.01)
*G01P 3/00* (2006.01)
*G01B 21/22* (2006.01)

(52) U.S. Cl.
CPC ..... *B60W 30/18036* (2013.01); *B60K 7/0007* (2013.01); *B60W 10/08* (2013.01); *B60W 40/08* (2013.01); *B60W 40/105* (2013.01); *B60W 40/13* (2013.01); *G01B 21/22* (2013.01); *G01P 3/00* (2013.01); *B60W 2040/1315* (2013.01); *B60W 2510/20* (2013.01); *B60W 2520/10* (2013.01); *B60W 2520/22* (2013.01); *B60W 2530/20* (2013.01)

(58) Field of Classification Search
CPC ........... B60W 30/18036; B60W 40/08; B60W 40/105; B60W 40/13; B60W 10/08; B60W 2040/1315; B60W 2510/20; B60W 2520/10; B60W 2520/22; G01B 21/22
See application file for complete search history.

(56) References Cited

U.S. PATENT DOCUMENTS 5,747,683 A * 5/1998 Gerum .................. B60T 8/1708
701/72
9,120,359 B2 * 9/2015 Chiu ........................ B60D 1/30
(Continued)

*Primary Examiner* — Peter D Nolan
*Assistant Examiner* — Wae L Louie
(74) *Attorney, Agent, or Firm* — Fox Rothschild LLP

(57) ABSTRACT

An apparatus and method for controlling articulation of an articulated vehicle may prevent jackknifing of the articulated vehicle driven backwards. The apparatus includes a hitch angle calculator configured to calculate a desired hitch angle based on a steering angle and a speed of the articulated vehicle, an error calculator configured to calculate an error between the desired hitch angle and an actual hitch angle of the articulated vehicle, a moment generator configured to generate a moment for controlling the articulation of the articulated vehicle based on the error, and an articulation controller configured to control the articulation of the articulated vehicle based on the moment.

18 Claims, 11 Drawing Sheets

(56) References Cited

U.S. PATENT DOCUMENTS

| | | | |
|---|---|---|---|
| 9,827,818 B2* | 11/2017 | Hu | B60D 1/30 |
| 11,186,314 B2* | 11/2021 | Shoshan | B60D 1/173 |
| 11,358,637 B2* | 6/2022 | Kroeze | G01S 17/931 |
| 2015/0051795 A1* | 2/2015 | Keys, II | B60W 30/18036 |
| | | | 701/41 |
| 2015/0165850 A1* | 6/2015 | Chiu | B60D 1/30 |
| | | | 701/1 |
| 2015/0210317 A1* | 7/2015 | Hafner | B62D 13/06 |
| | | | 701/41 |
| 2017/0073005 A1* | 3/2017 | Ghneim | B62D 13/06 |
| 2020/0164919 A1* | 5/2020 | Cotter | B62D 15/025 |
| 2021/0347409 A1* | 11/2021 | Nakano | B62D 13/00 |
| 2021/0387630 A1* | 12/2021 | Sung | B60W 40/114 |
| 2021/0394758 A1* | 12/2021 | Sung | B60W 40/13 |

* cited by examiner

<WHEEL STEERING ANGLE> offset=0   <HITCH ANGLE>

<WHEEL TORQUE>

<No Control> offset=0      <Control>

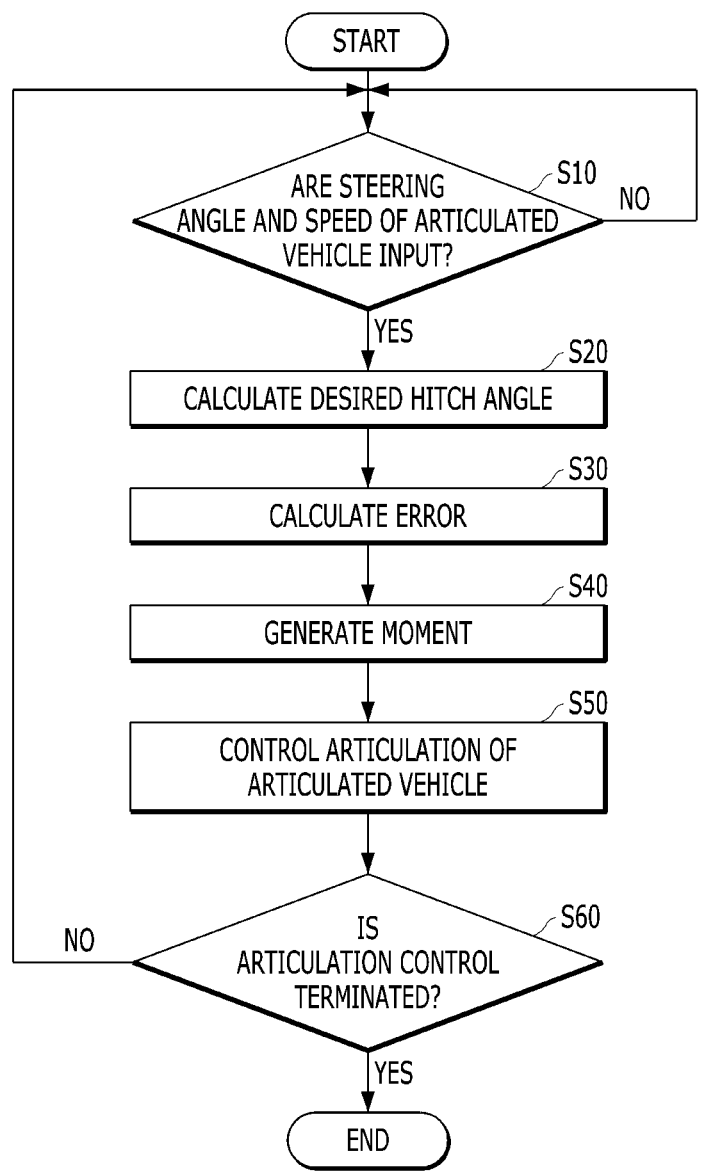

APPARATUS AND METHOD FOR CONTROLLING ARTICULATION OF ARTICULATED VEHICLE

This application claims under 35 U.S.C. § 119(a) the benefit of Korean Patent Application No. 10-2020-0076567, filed on Jun. 23, 2020, the entire contents of which are incorporated by reference herein.

BACKGROUND

(a) Technical Field

The present disclosure relates to an apparatus for controlling articulation of an articulated vehicle, more particularly, to the apparatus and method which may prevent jackknifing of the articulated vehicle during turning while being driven backwards.

(b) Description of the Related Art

In general, articulated vehicles are one mode of transportation a vehicle is manufactured so as to be easily bent even on a curved road by connecting two or more vehicle sections by an articulated joint, such as articulated buses, tractor-trailer vehicles, and trains.

Recently, a pusher-type articulated vehicle has been developed, where the pusher-type articulated vehicle has a rear axle that is driven, and to which a wheel motor axle for electric buses is applied.

Such a pusher-type articulated vehicle requires an articulation system for preventing unstable behavior of the vehicle, such as jackknifing.

Jackknifing refers to the folding of a rear vehicle body connected to a front vehicle body of an articulated vehicle towards the front vehicle body due to inertial force so that it resembles the acute angle of a folding pocket knife when the articulated vehicle suddenly brakes on a curved road.

Therefore, an articulation system performs safety control so as to prevent the articulated vehicle from jackknifing through an increase or decrease in damping force of hydraulic equipment and vehicle power cutoff control depending on a hitch angle between the front vehicle body and the rear vehicle body.

However, in the articulated vehicle, the hitch angle during turning while being driven backwards is increased compared to the hitch angle during turning while being driven forwards, and thus, jackknifing of the articulated vehicle easily occurs during turning while being driven backwards.

Particularly, if a steering angle set by a driver and the hitch angle of the articulated vehicle do not coincide with a turning curve when the articulated vehicle turns while being driven backwards, the hitch angle is rapidly increased, and thus the articulated vehicle may be excessively folded.

Thereby, if the articulated vehicle is driven backwards and parked in a garage having a narrow space, an unskilled driver may suffer the inconvenience of being required to reciprocate back and forth, and there may be a greater likelihood of colliding with other vehicles.

Further, when an articulated electric vehicle is driven backwards and parked at a charging station so as to be charged, a driver typically must be skilled, and in addition, it may take an excessively long time to park the articulated electric vehicle and the risk of an accident may be increased.

Therefore, development of an apparatus for controlling articulation of an articulated vehicle, which may prevent jackknifing of the articulated vehicle during turning while being driven backwards, so as to improve driver convenience and safety, is required.

SUMMARY

An object of the present disclosure is to provide an apparatus and method for controlling articulation of an articulated vehicle, which may prevent jackknifing of the articulated vehicle during turning while being driven backwards by controlling the articulation of the articulated vehicle based on a steering angle and a vehicle speed, and thus improve driver convenience and safety.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an apparatus for controlling articulation of an articulated vehicle includes a hitch angle calculator configured to calculate a desired hitch angle based on a steering angle and a speed of the articulated vehicle, an error calculator configured to calculate an error between the desired hitch angle and an actual hitch angle of the articulated vehicle, a moment generator configured to generate a moment for controlling the articulation of the articulated vehicle based on the error, and an articulation controller configured to control the articulation of the articulated vehicle based on the moment.

In another aspect of the present disclosure, a method for controlling articulation of an articulated vehicle in an apparatus for controlling the articulation of the articulated vehicle, the apparatus including a processor for controlling the articulation, includes confirming, by the processor, whether or not a steering angle and a speed of the articulated vehicle are input, calculating, by the processor, a desired hitch angle based on the steering angle and the speed of the articulated vehicle when the steering angle and the speed of the articulated vehicle are input, calculating, by the processor, an error between the desired hitch angle and an actual hitch angle of the articulated vehicle, generating, by the processor, a moment for controlling the articulation of the articulated vehicle based on the error, and controlling, by the processor, the articulation of the articulated vehicle based on the moment.

In yet another aspect of the present disclosure, a computer readable recording medium, in which a program for executing the method for controlling the articulation of the articulated vehicle in the apparatus for controlling the articulation of the articulated vehicle is recorded, executes a process provided by the method for controlling the articulation of the articulated vehicle.

In still yet another aspect of the present disclosure, an articulated vehicle includes a sensing device configured to sense a steering angle and a speed of the articulated vehicle, and an apparatus for controlling articulation of the articulated vehicle based on the sensed steering angle and speed of the articulated vehicle, wherein the apparatus calculates a desired hitch angle based on the steering angle and the speed of the articulated vehicle, calculates an error between the desired hitch angle and an actual hitch angle of the articulated vehicle, generates a moment for controlling the articulation of the articulated vehicle based on the error, and controls the articulation of the articulated vehicle based on the moment.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 is a flowchart illustrating a method for controlling articulation of an articulated vehicle in the apparatus according to one embodiment of the present disclosure.

DETAILED DESCRIPTION OF THE DISCLOSURE

Figure 1:
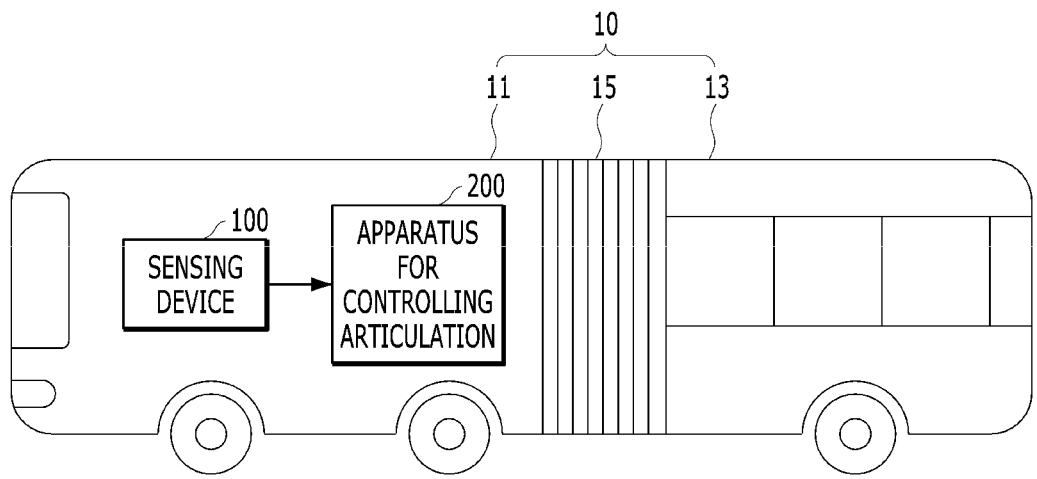
FIG. 1 is a view illustrating an articulated vehicle in which an apparatus for controlling articulation of an articulated vehicle according to one embodiment of the present disclosure is mounted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. However, the disclosure of the disclosure is not limited to the embodiments set forth herein, and may be variously modified. In the drawings, in order to clearly describe the present disclosure, descriptions of elements which are not related to the present disclosure will be omitted, and the same or similar elements are denoted by the same reference numerals even when they are depicted in different drawings.

Hereinafter, with reference to FIGS. 1 to 11, an apparatus and method for controlling articulation of an articulated vehicle, which are applicable to the embodiments of the present disclosure, will be described in detail.

FIG. 1 is a view illustrating an articulated vehicle in which an apparatus for controlling articulation of the articulated vehicle according to one embodiment of the present disclosure is mounted.

As shown in FIG. 1, an articulated vehicle 10 according to the present disclosure may include a front vehicle body 11 which is a tractor, a rear vehicle body 13 which is a trailer, and an articulated joint 15 configured to connect the front vehicle body 11 and the rear vehicle body 13 so as to be articulated, without being limited thereto.

That is, the articulated vehicle 10 according to the present disclosure is applicable to various kinds of vehicles in which two or more vehicle sections are connected, such as articulated buses, tractor-trailer vehicles, and trains.

The articulated vehicle 10 according to the present disclosure may include a sensing device 100 configured to sense a steering angle and a speed of the articulated vehicle 10, and an apparatus 200 for controlling articulation of the articulated vehicle 10 based on the sensed steering angle and vehicle speed.

Here, the apparatus 200 may calculate a desired hitch angle based on the steering angle and the speed of the articulated vehicle 10, calculate an error between the desired hitch angle and the actual hitch angle of the articulated vehicle 10, generate a moment for controlling the articulation of the articulated vehicle 10 based on the error, and control the articulation of the articulated vehicle 10 based on the moment.

That is, the apparatus 200 may be a safety assistance control apparatus which may independently control left and right wheel motors of the articulated vehicle 10 so as to stably control the articulation of the articulated vehicle 10 driven backwards.

In the calculation of the desired hitch angle, the apparatus 200 may calculate the desired hitch angle in consideration of the steady state of the articulated vehicle 10.

Further, in the calculation of the desired hitch angle, when the articulated vehicle 10 is driven backwards, the apparatus 200 may receive the steering angle and the speed of the articulated vehicle 10 corresponding to backward driving, and calculate the desired hitch angle based on the received steering angle and vehicle speed.

In addition, in the calculation of the desired hitch angle, the apparatus 200 may receive the wheel steering angle of the front vehicle body 11 and then calculate the desired hitch angle, if the articulated vehicle 10 includes the front vehicle body 11 and at least one rear vehicle body 13 connected to the front vehicle body 11.

Further, in the calculation of the error, the apparatus 200 may, when the actual hitch angle of the articulated vehicle 10 corresponding to backward driving of the articulated vehicle 10 is input from the sensing device 100, calculate the error between the input actual hitch angle and the desired hitch angle.

Moreover, in the generation of the moment, the apparatus 200 may generate the moment for controlling the articulation of the articulated vehicle 10 by performing proportional-integral control based on the error between the actual hitch angle and the desired hitch angle.

Further, in the control of the articulation of the articulated vehicle 10, the apparatus 200 may distribute the generated moment to each of a left wheel motor and a right wheel motor of the rear vehicle body 13 of the articulated vehicle 10 so as to control wheel motor torques of the rear vehicle body 13 of the articulated vehicle 10, thereby stably controlling the articulation of the articulated vehicle 10 driven backwards.

As such, in the present disclosure, the articulation of the articulated vehicle 10 may be controlled based on the steering angle and the vehicle speed, thereby preventing jackknifing of the articulated vehicle 10 during turning while being driven backwards and thus being capable of improving driver convenience and safety.

Further, in the present disclosure, when the articulated vehicle 10 changes lanes while being driven backwards, articulation control is performed so as to maintain the desired hitch angle of the articulated vehicle 10 and thus allows the articulated vehicle 10 to stably change lanes, thereby being capable of preventing jackknifing of the articulated vehicle 10.

Therefore, in the present disclosure, the steering direction and the backward driving direction of the articulated vehicle 10 coincide with each other, thereby being capable of preventing a driver's erroneous operation and thus increasing the marketability of the articulated vehicle 10 due to improved driving stability and safety thereof.

Figure 2:
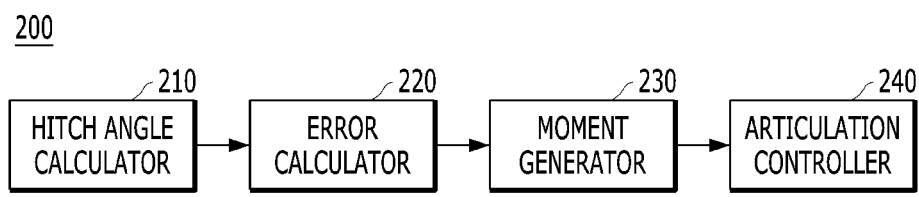
FIG. 2 is a block diagram illustrating the apparatus according to one embodiment of the present disclosure.

FIG. 2 is a block diagram illustrating the apparatus according to one embodiment of the present disclosure.

As shown in FIG. 2, the apparatus 200 according to the present disclosure is an apparatus which prevents jackknifing of an articulated vehicle driven backwards using torque vectoring of wheel motors, and may include a hitch angle calculator 210, an error calculator 220, a moment generator 230 and an articulation controller 240.

Here, the hitch angle calculator 210 may calculate the desired hitch angle based on the steering angle and the speed of an articulated vehicle.

If the articulated vehicle is driven backwards, the hitch angle calculator 210 may, when the steering angle and the speed of the articulated vehicle corresponding to backward driving are input, calculate the desired hitch angle based on the input steering angle and vehicle speed.

For example, the hitch angle calculator 210 may calculate the desired hitch angle in consideration of the steady state of the articulated vehicle based on the dynamic tractor-trailer vehicle model.

That is, the hitch angle calculator 210 may calculate the desired hitch angle using the following equation.

$$\theta_{ref} = \frac{(b_1 - c_1 - l_2) + K_s V_x^2}{l_1 + [K_u - \Delta K_u] V_x^2} \delta_{cmd} =$$

$$\frac{(b_1 - c_1 - l_2) + \frac{M_2 a_2}{C_{ar} l_2} - \frac{[M_1 l_2 a_1 + M_2 b_2 (a_1 + c_1)]}{C_{ar} l_1 l_2} V_x^2}{l_1 + \left[ \frac{M_1 (C_{ar} b_1 - C_{af} a_1)}{C_{af} C_{ar} l_1} - \frac{M_2 b_2 [C_{af} (a_1 + c_1) + C_{ar} (c_1 - b_1)]}{C_{af} C_{ar} l_1 l_2} \right] V_x^2} \delta_{cmd}$$

Here, $\theta_{ref}$ may be the desired hitch angle, $\delta_{cmd}$ may be the steering angle according to a driver's steering command, $V_x$ may be the speed of the articulated vehicle, $M_1$ may be the weight of the tractor of the articulated vehicle, $M_2$ may be the weight of the trailer of the articulated vehicle, $a_1$ may be the distance from the center of gravity of the tractor to a front axle thereof, $b_1$ may be the distance from the center of gravity of the tractor to a rear axle thereof, $c_1$ may be the distance from the center of gravity of the tractor to a hitch point, $a_2$ may be the distance from the center of gravity of the trailer to the hitch point, $b_2$ may be the distance from the center of gravity of the trailer to a trailer axle, $C_{af}$ may be the cornering stiffness of front tires of the tractor, $C_{ar}$ may be the cornering stiffness of rear tires of the tractor, $C_{at}$ may be the cornering stiffness of tires of the trailer, $l_1$ may be $a_1 + b_1$, and $l_2$ may be $a_2 + b_2$.

Further, if the articulated vehicle includes a front vehicle body and at least one rear vehicle body connected to the front vehicle body, the hitch angle calculator 210 may receive the wheel steering angle of the front vehicle body and then calculate the desired hitch angle.

Next, the error calculator 220 may calculate an error between the desired hitch angle and the actual hitch angle of the articulated vehicle.

If the articulated vehicle is driven backwards, the error calculator 220 may, when the actual hitch angle of the articulated vehicle corresponding to backward driving is input, calculate the error between the desired hitch angle and the input actual hitch angle of the articulated vehicle.

For example, the error calculator 220 may include a subtractor, which calculates the error between the desired hitch angle and the actual hitch angle of the articulated vehicle and outputs the calculated error to the moment generator 230, without being limited thereto.

Subsequently, the moment generator 230 may generate a moment for controlling the articulation of the articulated vehicle based on the error calculated by the error calculator 220.

For example, the moment generator 230 may include a proportional-integral (PI) controller which, when the error between the desired hitch angle and the actual hitch angle of the articulated vehicle are input, generates the moment for controlling the articulation of the articulated vehicle by performing proportional-integral control based on the error, without being limited thereto.

Further, the articulation controller 240 may control the articulation of the articulated vehicle based on the generated moment.

Here, the articulation controller 240 may, when the moment is input, distribute the input moment to a left wheel motor and a right wheel motor of the rear vehicle body of the articulated vehicle so as to control the wheel motor torques of the rear vehicle body of the articulated vehicle.

Figure 3:
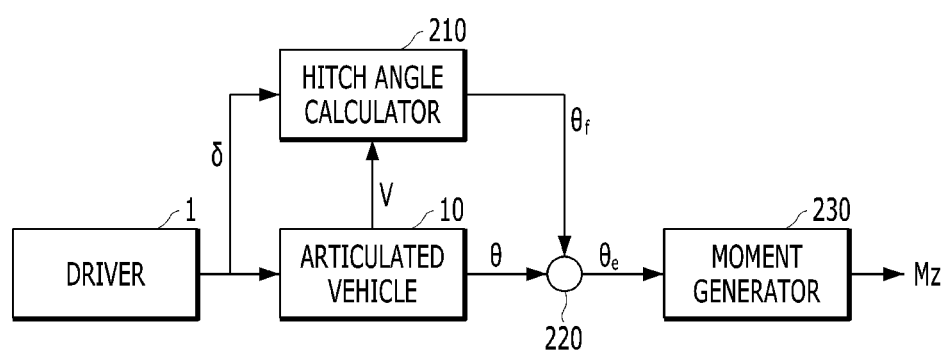
FIG. 3 is a circuit diagram illustrating a process of generating an articulation control moment in the apparatus according to one embodiment of the present disclosure.

FIG. 3 is a circuit diagram illustrating a process of generating an articulation control moment in the apparatus according to one embodiment of the present disclosure.

As shown in FIG. 3, when an articulated vehicle 10 is driven backwards according to a command of a driver 1, the hitch angle calculator 210 of the apparatus may receive a sensed speed V from the articulated vehicle 10, and receive a steering angle δ according to a steering command of the driver 1.

Thereafter, the hitch angle calculator 210 may calculate a desired hitch angle $\theta_f$ based on the received steering angle δ and speed V of the articulated vehicle 10.

For example, the hitch angle calculator 210 may calculate the desired hitch angle $\theta_f$ in consideration of the steady state of the articulated vehicle 10 based on the dynamic tractor-trailer vehicle model.

Next, the error calculator 220 may receive a sensed actual hitch angle θ from the articulated vehicle 10, and receive the desired hitch angle $\theta_f$ from the hitch angle calculator 210.

Here, the error calculator 220 may calculate an error $\theta_e$ between the desired hitch angle $\theta_f$ and the actual hitch angle θ of the articulated vehicle 10.

For example, the error calculator 220 may include a subtractor, which calculates the error $\theta_e$ between the desired hitch angle $\theta_f$ and the actual hitch angle θ of the articulated vehicle 10 and outputs the calculated error $\theta_e$ to the moment generator 230, without being limited thereto.

Subsequently, the moment generator 230 may, when the error $\theta_e$ is input, generate a moment Mz for controlling the articulation of the articulated vehicle 10 based on the error $\theta_e$.

For example, the moment generator 230 may include a proportional-integral (PI) controller which generates the moment for controlling the articulation of the articulated vehicle 10 by performing proportional-integral control based on the error $\theta_e$, without being limited thereto.

Figure 4:
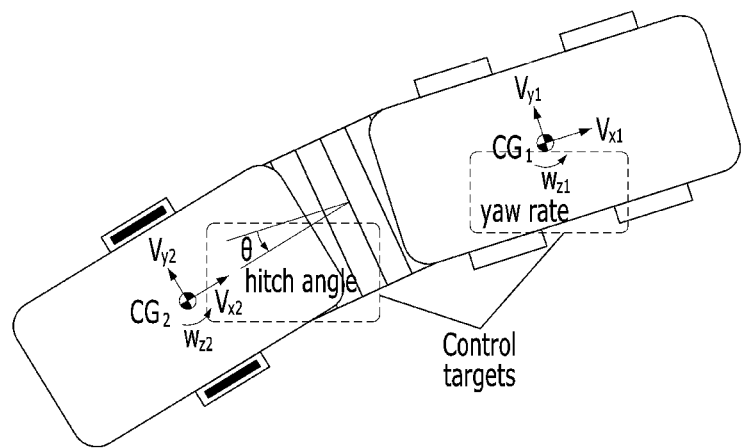
FIGS. 4 and 5 are views illustrating a process of calculating a hitch angle in the apparatus.
Figure 5:
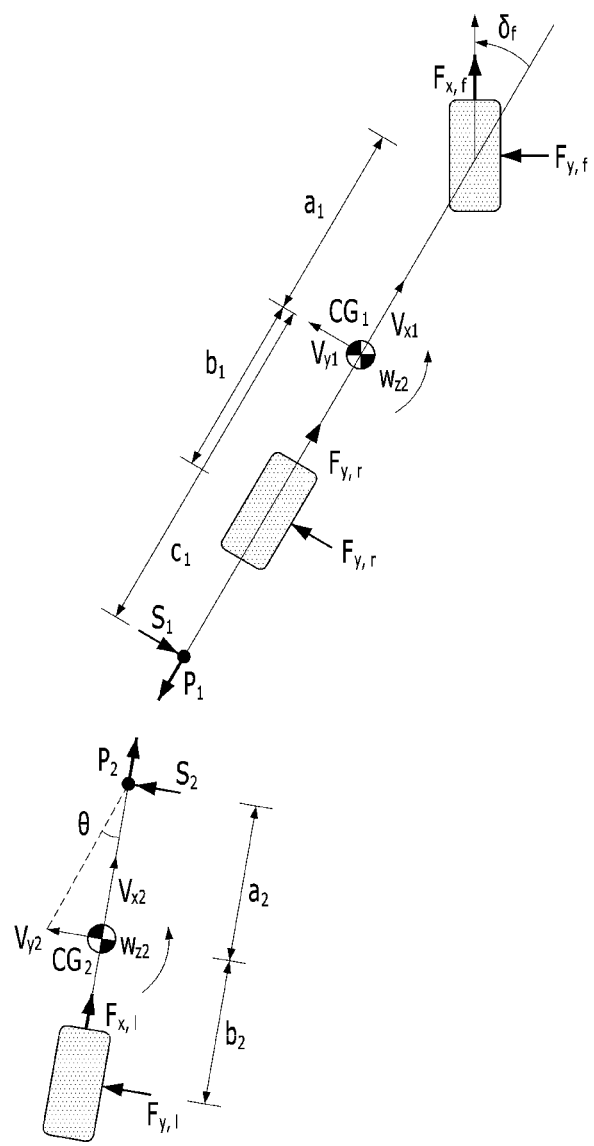

FIGS. 4 and 5 are views illustrating a process of calculating a hitch angle in the apparatus.

As shown in FIGS. 4 and 5, the apparatus according to the present disclosure may calculate a desired hitch angle based on a dynamic tractor-trailer vehicle model in consideration of the steady state of an articulated vehicle.

Here, the desired hitch angle $\theta_{ref}$ may be calculated using the following equation.

$$\theta_{ref} = \frac{(b_1 - c_1 - l_2) + K_s V_x^2}{l_1 + [K_u - \Delta K_u] V_x^2} \delta_{cmd} =$$

-continued $$\frac{(b_1 - c_1 - l_2) + \frac{M_2 a_2}{C_{ar} l_2} - \frac{[M_1 l_2 a_1 + M_2 b_2(a_1 + c_1)]}{C_{ar} l_1 l_2} V_x^2}{l_1 + \left[ \frac{M_1(C_{ar} b_1 - C_{af} a_1)}{C_{af} C_{ar} l_1} - \frac{M_2 b_2 [C_{af}(a_1 + c_1) + C_{ar}(c_1 - b_1)]}{C_{af} C_{ar} l_1 l_2} \right] V_x^2} \delta_{cmd}$$

Here, $\theta_{ref}$ may be the desired hitch angle, $\delta_{cmd}$ may be the steering angle according to a driver's steering command, $V_x$ may be the speed of the articulated vehicle, $M_1$ may be the weight of the tractor of the articulated vehicle, $M_2$ may be the weight of the trailer of the articulated vehicle, $a_1$ may be the distance from the center of gravity of the tractor to a front axle thereof, $b_1$ may be the distance from the center of gravity of the tractor to a rear axle thereof, $c_1$ may be the distance from the center of gravity of the tractor to a hitch point, $a_2$ may be the distance from the center of gravity of the trailer to the hitch point, $b_2$ may be the distance from the center of gravity of the trailer to a trailer axle, $C_{af}$ may be the cornering stiffness of front tires of the tractor, $C_{ar}$ may be the cornering stiffness of rear tires of the tractor, $C_{at}$ may be the cornering stiffness of tires of the trailer, $l_1$ may be $a_1 + b_1$, and $l_2$ may be $a_2 + b_2$.

Figure 6:
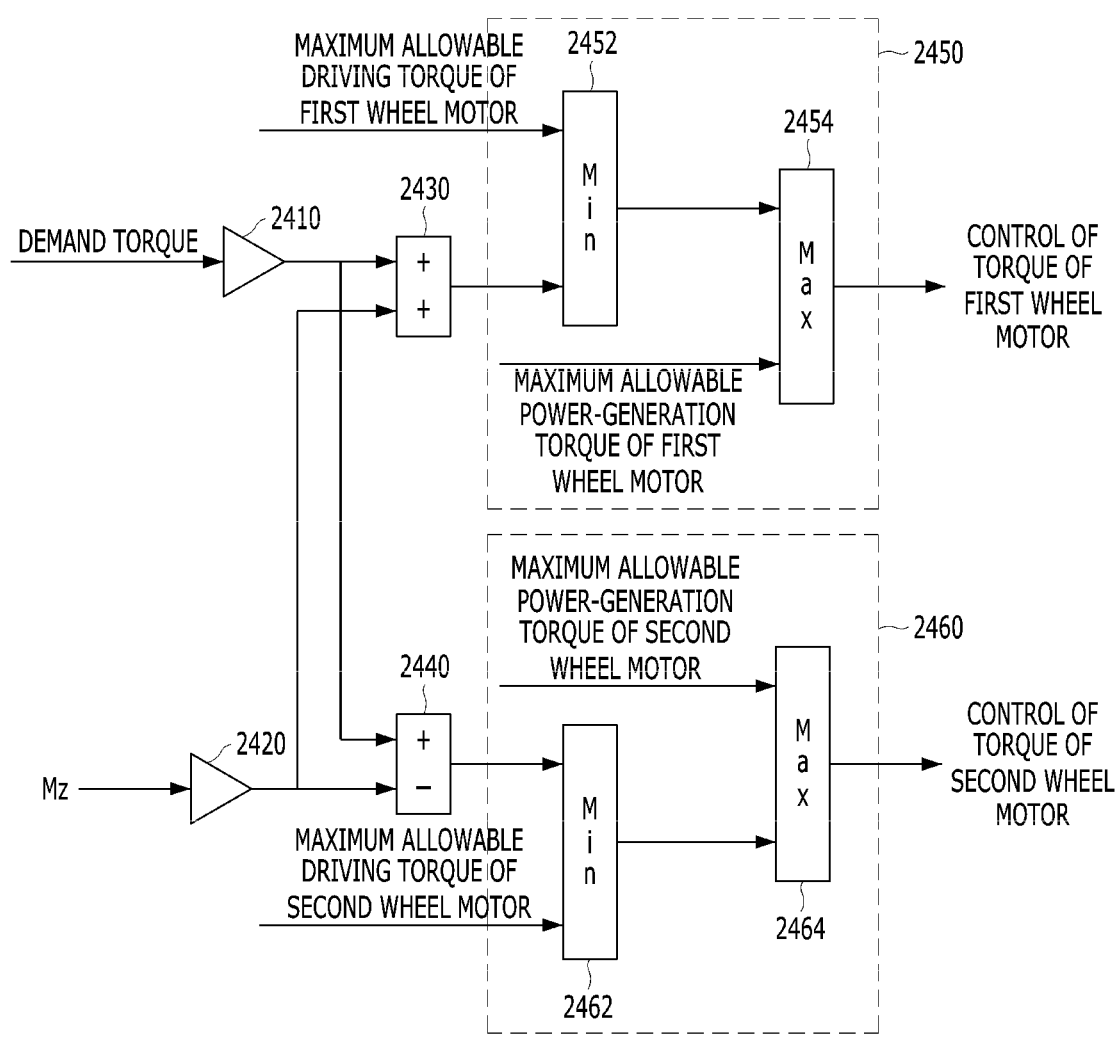
FIG. 6 is a circuit diagram illustrating an articulation controller of the apparatus.

FIG. 6 is a circuit diagram illustrating the articulation controller of the apparatus.

As shown in FIG. 6, when the moment $M_z$ is input, the articulation controller may distribute the input moment $M_z$ to each of a left wheel motor and a right wheel motor of the rear vehicle body of the articulated vehicle so as to control wheel motor torques of the rear vehicle body of the articulated vehicle.

That is, the moment required to track the hitch angle may be distributed to left and right wheels of the trailer of the articulated vehicle as forces in opposite directions.

For example, the articulation controller may include first and second amplifiers 2410 and 2420, an adder 2430, a subtractor 2440, a first wheel motor torque controller 2450, and a second wheel motor torque controller 2460.

Here, the first amplifier 2410 may amplify a signal corresponding to an input demand torque, and the second amplifier 2420 may amplify a signal corresponding to the moment $M_z$.

Further, the adder 2430 may add output values from the first and second amplifiers 2410 and 2420, and the subtractor 2440 may subtract the output values from the first and second amplifiers 2410 and 2420.

Thereafter, the first wheel motor torque controller 2450 may calculate a first torque control value based on an output value from the adder 2430 and the torque limit value of the left wheel motor and thus control the torque of the left wheel motor, and the second wheel motor torque controller 2460 may calculate a second torque control value based on an output value from the subtractor 2440 and the torque limit value of the right wheel motor and thus control the torque of the right wheel motor.

For example, when the demand torque calculated based on an accelerator pedal sensor and a vehicle speed is input, the first amplifier 2410 may amplify the input demand torque.

Further, the first wheel motor torque controller 2450 may include a first calculator 2452 which, when the output value from the adder 2430 and the maximum allowable driving torque (+) corresponding to the left wheel motor are input, calculates and outputs a torque value less than the maximum allowable driving torque (+), and a second calculator 2454 which, when the torque value of the first calculator 2452 and the maximum allowable power-generation torque (−) corresponding to the left wheel motor are input, calculates and outputs a torque value less than the maximum allowable power-generation torque (−).

In addition, the second wheel motor torque controller 2460 may include a third calculator 2462 which, when the output value from the subtractor 2440 and the maximum allowable driving torque (+) corresponding to the right wheel motor are input, calculates and outputs a torque value less than the maximum allowable driving torque (+), and a fourth calculator 2464 which, when the torque value of the third calculator 2462 and the maximum allowable power-generation torque (−) corresponding to the right wheel motor are input, calculates and outputs a torque value less than the maximum allowable power-generation torque (−).

Figure 7:
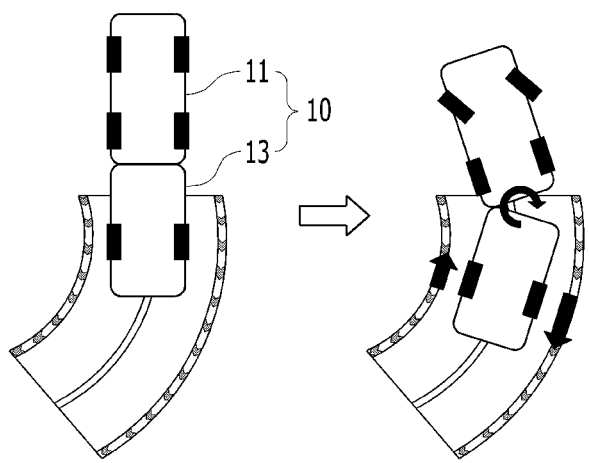
FIG. 7 is a view illustrating articulation control over the articulated vehicle driven backwards.

FIG. 7 is a view illustrating articulation control over the articulated vehicle driven backwards.

As shown in FIG. 7, the articulated vehicle 10 in which the apparatus according to the present disclosure is mounted maintains, when the articulated vehicle turns while being driven backwards, control torques to the left and right wheel motors of the trailer, i.e., the rear vehicle body 13, so as to maintain the hitch angle depending on the steering angle of the tractor, i.e., the front vehicle body 11, thereby stably performing articulation control.

That is, in the present disclosure, a moment is generated such that the driving direction and the steering direction of the articulated vehicle 10 coincide with each other, thereby preventing a driver from being confused about the backward driving direction of the articulated vehicle 10.

As such, in the present disclosure, moment control over the wheel motors may be used to assist in backward driving of the articulated vehicle.

Therefore, in the present disclosure, the desired hitch angle is tracked through feedback control such that the desired hitch angle is continuously maintained based on a steering angle and a vehicle speed, thereby reducing mistakes by a driver.

In some cases, in the present disclosure, when the articulated vehicle is driven backwards, even if a large hitch angle is not required (for example, if the steering handle is operated within about 45 degrees), the driving direction and the steering direction of the articulated vehicle may coincide with each other, and thus the present disclosure may be applied to precision parking.

Figure 8A:
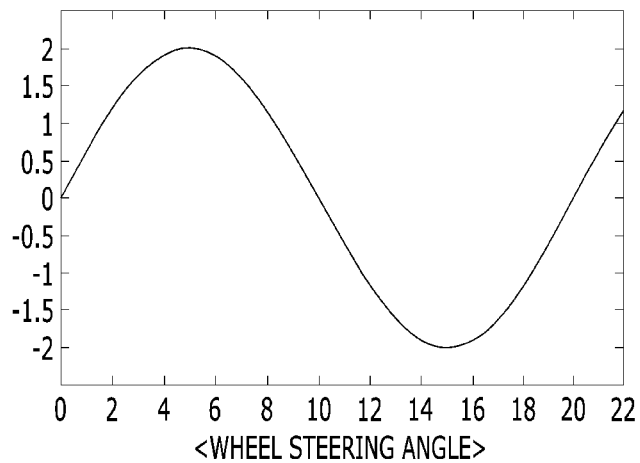
FIGS. 8A to 8C are graphs illustrating simulation results depending on articulation control over the articulated vehicle driven backwards.
Figure 8B:
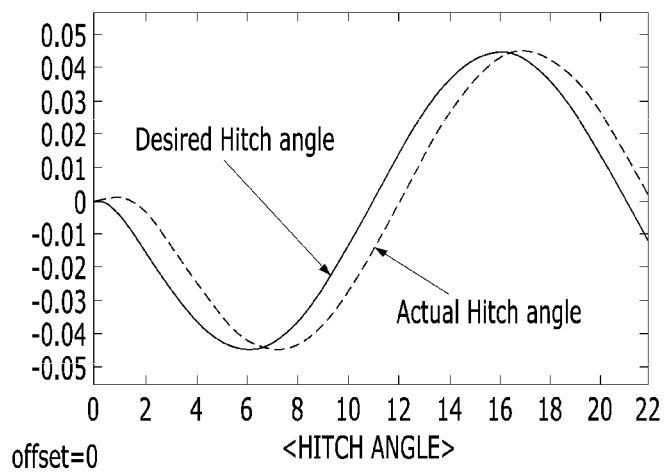
Figure 8C:
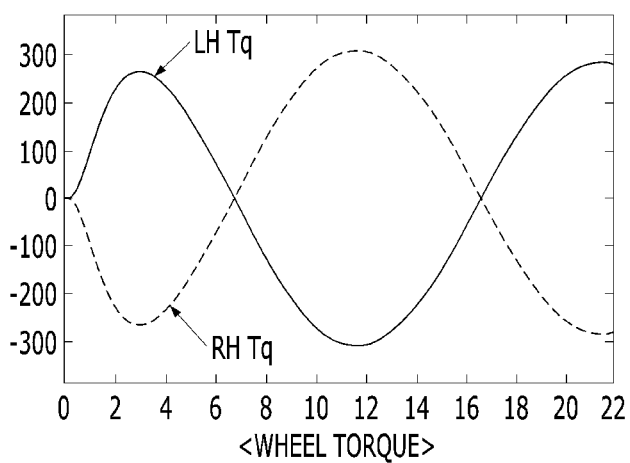

FIGS. 8A to 8C are graphs illustrating simulation results depending on articulation control over the articulated vehicle driven backwards.

FIG. 8A is a graph showing the wheel steering angle of the articulated vehicle driven backwards, FIG. 8B is a graph showing the hitch angle of the articulated vehicle driven backwards, and FIG. 8C is a graph showing the wheel torques of the articulated vehicle driven backwards.

As shown in FIGS. 8A to 8C, when the steering angle of the articulated vehicle driven backwards is about 2 degrees and the speed thereof is about −8 kph, the articulation of the articulated vehicle according to the present disclosure is stably controlled based on the steering angle and the vehicle speed, and thus, jackknifing of the articulated vehicle driven backwards may be prevented.

Figure 9:
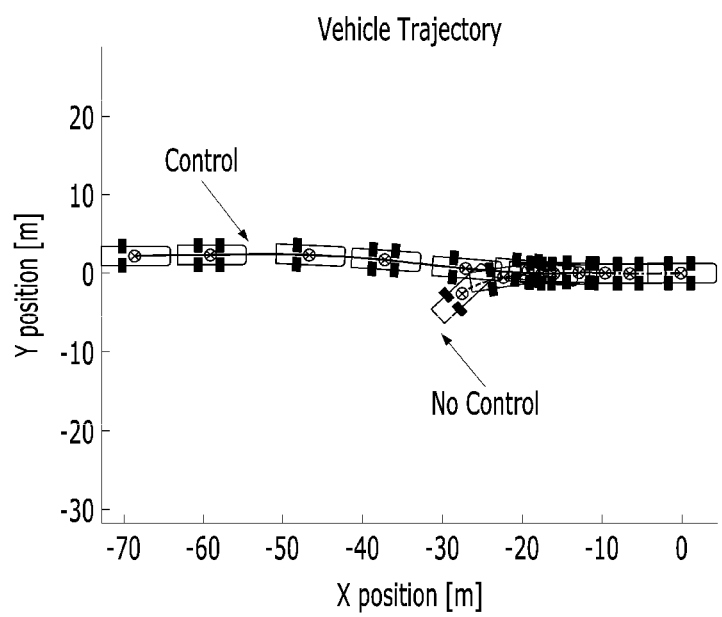
FIG. 9 is a graph comparatively representing the trajectories of articulated vehicles driven backwards depending on whether or not articulation control is performed.

FIG. 9 is a graph comparatively representing the trajectories of articulated vehicles driven backwards depending on whether or not articulation control is performed.

As shown in FIG. 9, if the articulated vehicle changes lanes while being driven backwards, when articulation control is not performed, the hitch angle of the articulated vehicle is rapidly increased, and thus jackknifing of the articulated vehicle may occur.

On the other hand, when articulation control is performed according to the present disclosure so that the hitch angle of the articulated vehicle is maintained, the articulated vehicle may stably change lanes while being driven backwards.

Therefore, in the present disclosure, the steering angle and the backward driving direction of the articulated vehicle coincide with each other, thereby being capable of preventing a driver's erroneous operation and increasing the marketability of the articulated vehicle due to improved driver assistance and safety functions.

FIGS. 10A to 10D show graphs comparatively representing simulation results of articulated vehicles driven backwards depending on whether or not articulation control is performed.

Figure 10A:
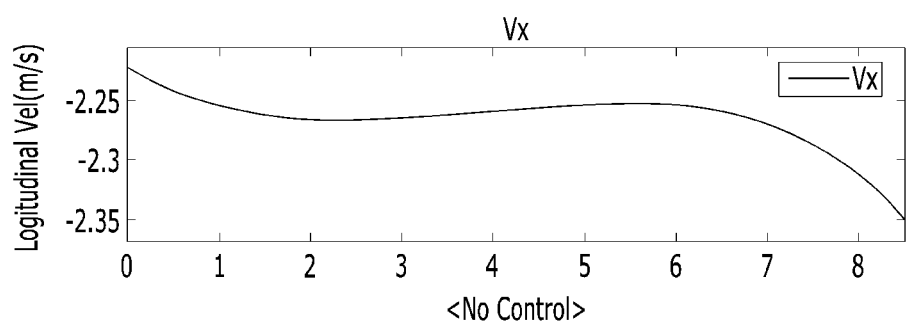
FIGS. 10A to 10D show graphs comparatively representing simulation results of articulated vehicles driven backwards depending on whether or not articulation control is performed.
Figure 10A:
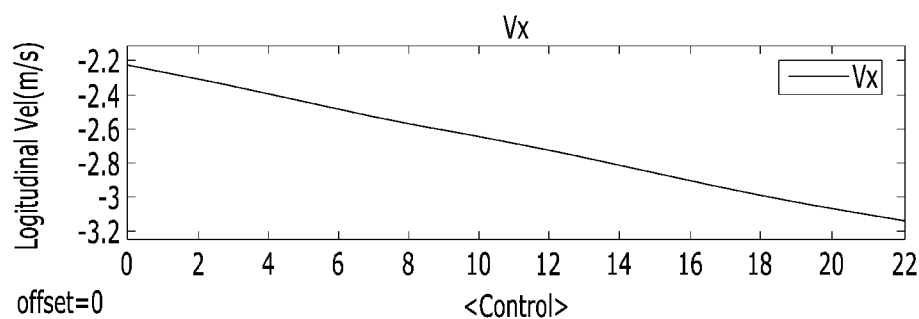
Figure 10B:
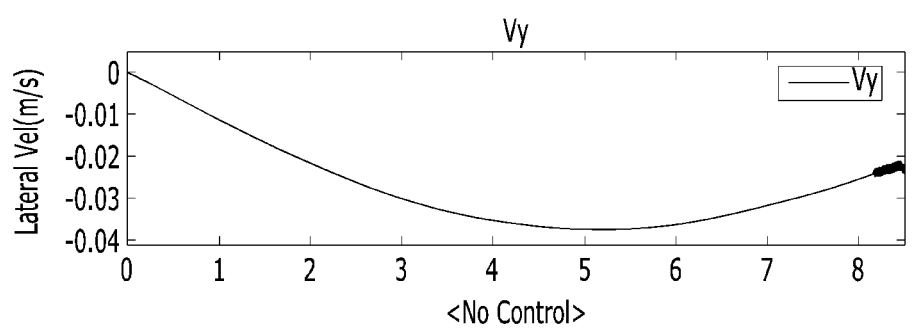
Figure 10B:
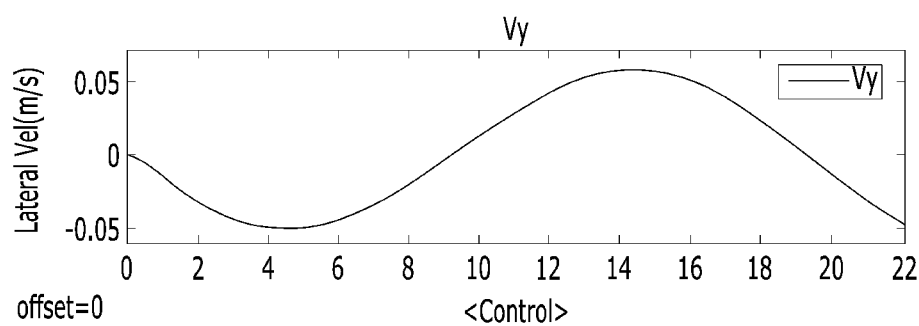
Figure 10C:
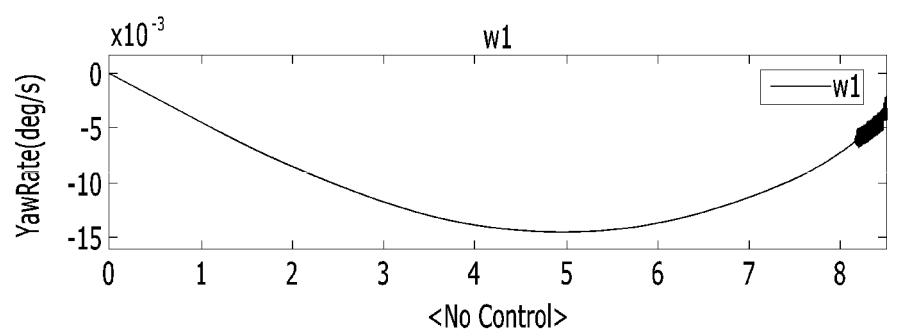
Figure 10C:
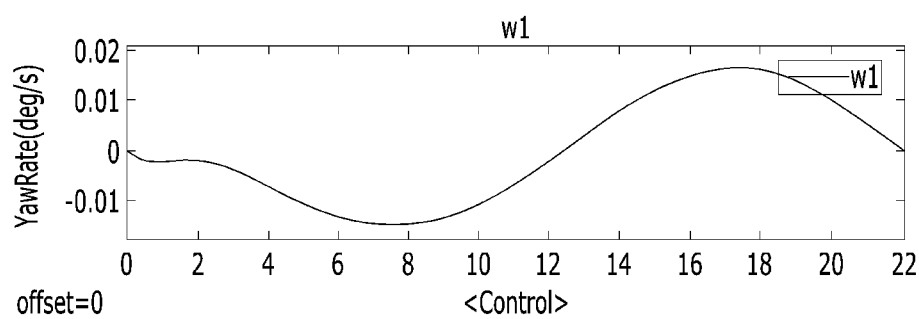
Figure 10D:
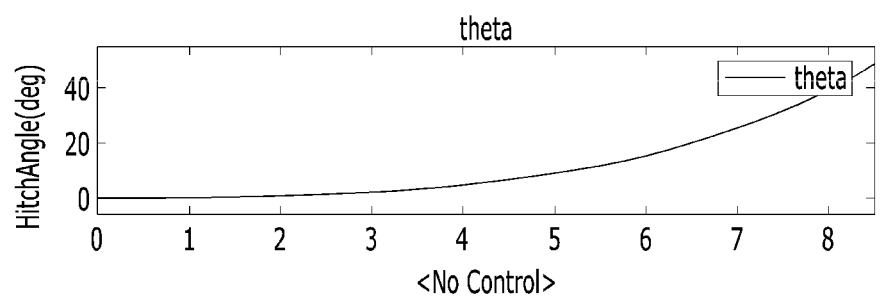
Figure 10D:
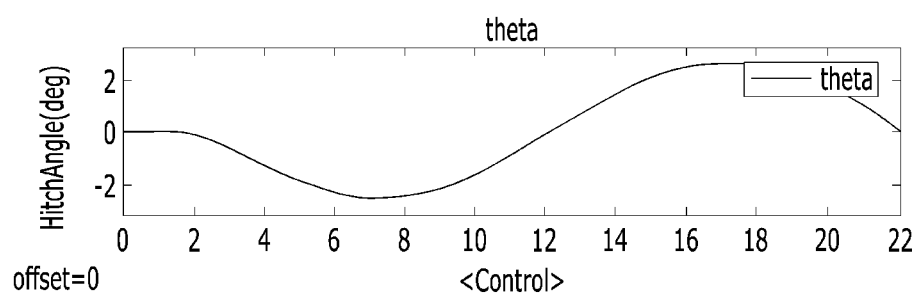

FIG. 10A shows graphs representing changes in the longitudinal velocities Vx of the articulated vehicles driven backwards depending on whether or not articulation control is performed, FIG. 10B shows graphs representing changes in the lateral velocities Vy of the articulated vehicles driven backwards depending on whether or not articulation control is performed, FIG. 10C shows graphs representing changes in the yaw rates w1 of the articulated vehicles driven backwards depending on whether or not articulation control is performed, and FIG. 10D shows graphs representing changes in the hitch angles θ of the articulated vehicles driven backwards depending on whether or not articulation control is performed.

As shown in FIGS. 10A to 10D, in the articulated vehicle in which articulation control according to the present disclosure is not performed, the hitch angle of the articulated vehicle diverges during backward driving of the articulated vehicle and thus jackknifing of the articulated vehicle may occur.

On the other hand, in the articulated vehicle in which articulation control according to the present disclosure is performed, both the yaw rate and the hitch angle of the articulated vehicle are changed depending on a change in the steering angle thereof, and thus jackknifing of the articulated vehicle may be prevented during backward driving and driver convenience and safety may be improved.

FIG. 11 is a flowchart illustrating a method for controlling articulation of an articulated vehicle in the apparatus according to one embodiment of the present disclosure.

As shown in FIG. 11, the apparatus according to the present disclosure may include a processor configured to control articulation of an articulated vehicle.

Here, the processor may include the elements shown in FIG. 2, without being limited thereto.

First, the processor may confirm whether or not the steering angle and the speed of the articulated vehicle are input (S10).

Here, the processor may acquire, when the articulated vehicle is driven backwards, the steering angle and the speed from the articulated vehicle driven backwards.

Thereafter, when the steering angle and the speed of the articulated vehicle are input, the processor may calculate a desired hitch angle based on the steering angle and the speed of the articulated vehicle (S20).

Here, the processor may calculate the desired hitch angle based on a dynamic tractor-trailer vehicle model in consideration of the steady state of the articulated vehicle.

Thereafter, the processor may calculate an error between the desired hitch angle and the actual hitch angle of the articulated vehicle (S30).

Here, when the actual hitch angle of the articulated vehicle driven backwards is input, the processor may calculate the error between the desired hitch angle and the actual hitch angle of the articulated vehicle.

Thereafter, the processor may generate a moment for controlling the articulation of the articulated vehicle based on the error (S40).

Here, the processor may generate a moment for controlling the articulation of the articulated vehicle by performing proportional-integral (PI) control based on the error.

Thereafter, the processor may control the articulation of the articulated vehicle based on the moment (S50).

Here, when the moment is input, the processor may distribute the input moment to each of a left wheel motor and a right wheel motor of a rear vehicle body of the articulated vehicle so as to control the wheel motor torques of the rear vehicle body of the articulated vehicle.

For example, in the control of the articulation of the articulated vehicle, the processor may respectively amplify and output a first signal corresponding to the moment and a second signal corresponding to an input demand torque, add and subtract the output values of the amplified first and second signals, calculate a first torque control value based on an output value, acquired by adding the amplified first and second signals, and the torque limit value of the left wheel motor and then control the torque of the left wheel motor based on the calculated first torque control value, and calculate a second torque control value based on an output value, acquired by subtracting the amplified first and second signals, and the torque limit value of the right wheel motor and then control the torque of the right wheel motor based on the calculated second torque control value.

Here, in the control of the torque of the left wheel motor, when the output value, acquired by adding the amplified first and second signals, and the maximum allowable driving torque (+) corresponding to the left wheel motor are input, the processor calculates and outputs a torque value less than the maximum allowable driving torque (+), and, when the torque value less than the maximum allowable driving torque (+) and the maximum allowable power-generation torque (−) corresponding to the left wheel motor are input, the processor calculates and outputs a torque value less than the maximum allowable power-generation torque (−).

Further, in the control of the torque of the right wheel motor, when the output value, acquired by subtracting the amplified first and second signals, and the maximum allowable driving torque (+) corresponding to the right wheel motor are input, the processor calculates and outputs a torque value less than the maximum allowable driving torque (+), and, when the torque value less than the maximum allowable driving torque (+) and the maximum allowable power-generation torque (−) corresponding to the right wheel motor are input, the processor calculates and outputs a torque value less than the maximum allowable power-generation torque (−).

Thereafter, the processor may confirm whether or not articulation control is terminated (S60), and terminate the above-described process for controlling the articulation of the articulated vehicle upon confirming that articulation control is terminated.

As such, in the present disclosure, articulation of an articulated vehicle is controlled based on the steering angle and the speed of the articulated vehicle, thereby preventing jackknifing of the articulated vehicle during turning while being driven backwards, and thus improving driver's convenience and safety.

Further, in the present disclosure, when the articulated vehicle changes lanes while being driven backwards, articulation control is performed so as to maintain the desired hitch angle of the articulated vehicle and thus allows the articulated vehicle to stably change lanes, thereby being capable of preventing jackknifing of the articulated vehicle.

Therefore, in the present disclosure, the steering direction and the backward driving direction of the articulated vehicle coincide with each other, thereby being capable of preventing a driver's erroneous operation and thus increasing the marketability of the articulated vehicle due to improved driver assistance and safety functions.

In addition, in the present disclosure, a computer readable recording medium, in which a program for executing the method for controlling the articulation of the articulated vehicle in the apparatus for controlling the articulation of the articulated vehicle according to one embodiment of the present disclosure is recorded, may execute a process provided by the method for controlling the articulation of the articulated vehicle.

The present disclosure may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid state disk (SSD), a silicon disk drive (SDD), a ROM, a RAM, a CD-ROM, a magnetic tape, a floppy disk, an optical data storage device, etc.

As is apparent from the above description, in an apparatus and method for controlling articulation of an articulated vehicle according to at least one embodiment of the present disclosure, the articulation of the articulated vehicle is controlled based on the steering angle and the speed of the articulated vehicle, thereby preventing jackknifing of the articulated vehicle during turning while being driven backwards, and thus improving driver's convenience and safety.

Further, in the present disclosure, when the articulated vehicle changes lanes while being driven backwards, articulation control is performed so as to maintain the desired hitch angle of the articulated vehicle and thus allows the articulated vehicle to stably change lanes, thereby being capable of preventing jackknifing of the articulated vehicle.

Therefore, in the present disclosure, the steering direction and the backward driving direction of the articulated vehicle coincide with each other, thereby being capable of preventing a driver's erroneous operation and thus increasing the marketability of the articulated vehicle due to improved driver assistance and safety functions.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An apparatus for controlling articulation of an articulated vehicle, comprising:
   a hitch angle calculator configured to calculate a desired hitch angle based on a steering angle and a speed of the articulated vehicle;
   an error calculator configured to calculate an error between the desired hitch angle and an actual hitch angle of the articulated vehicle;

a moment generator configured to generate a moment for controlling the articulation of the articulated vehicle based on the error; and an articulation controller configured to control the articulation o the articulated vehicle based on the moment, wherein the articulation controller comprises:

a first amplifier configured to amplify a signal corresponding to a demand torque;

a second amplifier configured to amplify a signal corresponding to the moment;

an adder configured to add output values from the first and second amplifiers;

a subtractor configured to subtract the output values from the first and second amplifiers;

a first wheel motor torque controller configured to calculate a first torque control value based on an output value from the adder and a torque limit value of a left wheel motor and to control a torque of the left wheel motor based on the first torque control value; and a second wheel motor torque controller configured to calculate a second torque control value based on an output value from the subtractor and a torque limit value of a right wheel motor and to control a torque of the right wheel motor based on the second torque control value.

2. The apparatus according to claim 1, wherein the hitch angle calculator calculates, when the steering angle and the speed of the articulated vehicle corresponding to backward driving of the articulated vehicle are input, the desired hitch angle based on the steering angle and the speed of the articulated vehicle.

3. The apparatus according to claim 1, wherein in the calculation of the desired hitch angle, the hitch angle calculator calculates the desired hitch angle based on calculation factors comprising the steering angle according to a driver's steering command, the speed of the articulated vehicle, a weight of a tractor of the articulated vehicle, a weight of a trailer of the articulated vehicle, a distance from a center of gravity of the tractor to a front axle thereof, a distance from the center of gravity of the tractor to a rear axle thereof, a distance from the center of gravity of the tractor to a hitch point, a distance from a center of gravity of a trailer to the hitch point, a distance from the center of gravity of the trailer to a trailer axle, a cornering stiffness of front tires of the tractor, a cornering stiffness of rear tires of the tractor, and a cornering stiffness of tires of the trailer.

4. The apparatus according to claim 1, wherein the error calculator calculates, when the actual hitch angle of the articulated vehicle corresponding to backward driving of the articulated vehicle is input, the error between the desired hitch angle and the actual hitch angle.

5. The apparatus according to claim 1, wherein the error calculator comprises a subtractor configured to calculate the error between the desired hitch angle and the actual hitch angle of the articulated vehicle and to output the calculated error to the moment generator.

6. The apparatus according to claim 1, wherein the moment generator comprises a proportional-integral (PI) controller configured to, when the error between the desired hitch angle and the actual hitch angle of the articulated vehicle is input, generate the moment for controlling the articulation of the articulated vehicle by performing proportional-integral control based on the error.

7. The apparatus according to claim 1, wherein the articulation controller distributes, when the moment is input, the moment to a left wheel motor and a right wheel motor of a rear vehicle body of the articulated vehicle so as to control wheel motor torques of the rear vehicle body.

8. The apparatus according to claim 1, wherein the first wheel motor torque controller comprises:

a first calculator configured, when the output value from the adder and a maximum allowable driving torque corresponding to the left wheel motor are input, to calculate and to output a torque value less than the maximum allowable driving torque; and a second calculator configured, when the torque value of the first calculator and a maximum allowable power-generation torque corresponding to the left wheel motor are input, to calculate and to output a torque value less than the maximum allowable power-generation torque.

9. The apparatus according to claim 1, wherein the second wheel motor torque controller comprises:

a third calculator configured, when the output value from the subtractor and a maximum allowable driving torque corresponding to the right wheel motor are input, to calculate and to output a torque value less than the maximum allowable driving torque; and a fourth calculator configured, when the torque value of the third calculator and a maximum allowable power-generation torque corresponding to the right wheel motor are input, to calculate and to output a torque value less than the maximum allowable power-generation torque.

10. A method for controlling articulation of an articulated vehicle in an apparatus for controlling the articulation of the articulated vehicle, the apparatus comprising a processor for controlling the articulation, the method comprising:

confirming, by the processor, whether or not a steering angle and a speed of the articulated vehicle are input;

calculating, by the processor, a desired hitch angle based on the steering angle and the speed of the articulated vehicle when the steering angle and the speed of the articulated vehicle are input;

calculating, by the processor, an error between the desired hitch angle and an actual hitch angle of the articulated vehicle;

generating, by the processor, a moment for controlling the articulation of the articulated vehicle based on the error; and controlling, by the processor, the articulation of the articulated vehicle based on the moment;

wherein controlling the articulation of the articulated vehicle comprises:

amplifying and outputting a first signal corresponding to the moment and a second signal corresponding to a demand torque;

adding and subtracting output values of the amplified first and second signals;

calculating a first torque control value based on an output value, acquired by adding the amplified first and second signals, and a torque limit value of a left wheel motor and controlling a torque of the left wheel motor based on the first torque control value; and calculating a second torque control value based on an output value, acquired by subtracting the amplified first and second signals, and a torque limit value of a right wheel motor and controlling a torque of the right wheel motor based on the second torque control value.

11. The method according to claim 10, wherein in calculating the desired hitch angle, when the steering angle and the speed of the articulated vehicle corresponding to backward driving of the articulated vehicle are input, the desired hitch angle is calculated based on the steering angle and speed of the articulated vehicle.

12. The method according to claim 10, wherein in calculating the desired hitch angle, the desired hitch angle is calculated based on calculation factors comprising the steering angle according to a driver's steering command, the speed of the articulated vehicle, a weight of a tractor of the articulated vehicle, a weight of a trailer of the articulated vehicle, a distance from a center of gravity of the tractor to a front axle thereof, a distance from the center of gravity of the tractor to a rear axle thereof, a distance from the center of gravity of the tractor to a hitch point, a distance from a center of gravity of a trailer to the hitch point, a distance from the center of gravity of the trailer to a trailer axle, a cornering stiffness of front tires of the tractor, a cornering stiffness of rear tires of the tractor and a cornering stiffness of tires of the trailer.

13. The method according to claim 10, wherein in calculating the error, when the actual hitch angle of the articulated vehicle corresponding to backward driving of the articulated vehicle is input, the error between the desired hitch angle and the actual hitch angle is calculated.

14. The method according to claim 10, wherein in generating the moment, when the error between the desired hitch angle and the actual hitch angle of the articulated vehicle is input, the moment for controlling the articulation of the articulated vehicle is generated by performing proportional-integral control based on the error.

15. The method according to claim 10, wherein in controlling the articulation of the articulated vehicle, when the moment is input, the moment is distributed to a left wheel motor and a right wheel motor of a rear vehicle body of the articulated vehicle so as to control wheel motor torques of the rear vehicle body.

16. The method according to claim 10, wherein controlling the torque of the left wheel motor comprises:
when the output value, acquired by adding the amplified first and second signals, and a maximum allowable driving torque corresponding to the left wheel motor are input, calculating and outputting a torque value less than the maximum allowable driving torque; and
when the torque value less than the maximum allowable driving torque and a maximum allowable power-generation torque corresponding to the left wheel motor are input, calculating and outputting a torque value less than the maximum allowable power-generation torque.

17. The method according to claim 10, wherein controlling the torque of the right wheel motor comprises:
when the output value, acquired by subtracting the amplified first and second signals, and a maximum allowable driving torque corresponding to the right wheel motor are input, calculating and outputting a torque value less than the maximum allowable driving torque; and
when the torque value less than the maximum allowable driving torque and a maximum allowable power-generation torque corresponding to the right wheel motor are input, calculating and outputting a torque value less than the maximum allowable power-generation torque.

18. An articulated vehicle comprising:
a sensing device configured to sense a steering angle and a speed of the articulated vehicle; and
an apparatus for controlling articulation of the articulated vehicle based on the sensed steering angle and speed of the articulated vehicle,
wherein the apparatus calculates a desired hitch angle based on the steering angle and the speed of the articulated vehicle, calculates an error between the desired hitch angle and an actual hitch angle of the articulated vehicle, generates a moment for controlling the articulation of the articulated vehicle based on the error, and controls the articulation of the articulated vehicle based on the moment,
wherein the apparatus amplifies and outputs a first signal corresponding to the moment and a second signal corresponding to a demand torque, adds and subtracts output values of the amplified first and second signals, calculates a first torque control value based on an output value acquired by adding the amplified first and second signals and a torque limit value of a left wheel motor and controlling a torque of the left wheel motor based on the first torque control value, and calculates a second torque control value based on an output value acquired by subtracting the amplified first and second signals and a torque limit value of a right wheel motor and controls a torque of the right wheel motor based on the second torque control value.

\* \* \* \* \*